(12) United States Patent
Wu

(10) Patent No.: US 8,641,456 B2
(45) Date of Patent: Feb. 4, 2014

(54) CONNECTOR WITH GROUNDING AND POWER CONTACTS

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/586,889

(22) Filed: Aug. 16, 2012

(65) Prior Publication Data

US 2013/0045642 A1 Feb. 21, 2013

(30) Foreign Application Priority Data

Aug. 19, 2011 (CN) .......................... 201120301750.4

(51) Int. Cl.
*H01R 24/00* (2011.01)
(52) U.S. Cl.
USPC .......................................................... 439/676
(58) Field of Classification Search
USPC ................................ 439/676, 345, 352, 76.1, 439/607.17–607.18, 353
See application file for complete search history.

(56) References Cited

U.S. PATENT DOCUMENTS

| | | | |
|---|---|---|---|
| 8,393,913 B2 * | 3/2013 | Wu | 439/345 |
| 8,398,427 B2 * | 3/2013 | Wu | 439/497 |
| 8,414,324 B2 * | 4/2013 | Reed et al. | 439/345 |
| 8,439,706 B2 * | 5/2013 | Sytsma et al. | 439/607.46 |
| 8,506,331 B2 * | 8/2013 | Wu | 439/607.18 |
| 2010/0091466 A1 * | 4/2010 | Wu | 361/747 |
| 2010/0091467 A1 * | 4/2010 | Wu | 361/747 |
| 2011/0194823 A1 | 8/2011 | Wu | |

* cited by examiner

*Primary Examiner* — Jean F Duverne
(74) *Attorney, Agent, or Firm* — Wei Te Chung; Ming Chieh Chang

(57) ABSTRACT

A connector comprises an insulative housing having a main body with an inserting cavity and a plurality of contacts received in the insulative housing. The contacts have two grounding contacts and two power contacts, each grounding contact is formed with a plurality of first contacting portion, and each power contact is formed with a plurality of second contacting portion. The first contacting portions of the first and the second grounding contacts are alternately disposed within the inserting cavity and located in a first row, the second contacting portions of the first and the second power contacts are alternately disposed within the inserting cavity and located in a second row, the first row is closer to a front opening of the inserting cavity than the second row.

11 Claims, 8 Drawing Sheets

CONNECTOR WITH GROUNDING AND POWER CONTACTS

BACKGROUND OF THE INVENTION

1. Field of the Invention

The present invention relates to a connector, especially to a connector having grounding and power contacts.

2. Description of the Related Art

Connector is widely used between electronic equipments to transmit signals. Many different kinds of connectors/cable assemblies are popular in the market, and many different transmitting protocols are defined for connectors, such as USB, SATA, HDMI, SAS, Displayport, Diiva, VGA, etc. A related cable assembly is disclosed in US Patent Application Publication No. 2011-0194823, the cable assembly has a connector and a cable, the connector includes an insulative housing and a plurality of contacts retained to the insulative housing, the cable electrically connects with the contacts and extending rearward from the insulative housing. The contacts comprise a plurality of power contacts, a plurality of differential signal contact pairs and a plurality of grounding contacts. The insulative housing has an inserting port, each contact has a contacting portion extending into the inserting port, and every two adjacent differential signal contact pairs has a contacting portion of the grounding disposed therebetween.

SUMMARY OF THE INVENTION

An object of the invention is to provide a connector with grounding and power contacts to provide a high transmission quality.

To achieve the above-mentioned object, a connector comprises an insulative housing having a main body with an inserting cavity; and a plurality of contacts received in the insulative housing. The contacts have at least one grounding contact formed with a plurality of first contacting portion exposed in the inserting cavity in a first row, and at least one power contact formed with a plurality of second contacting portion exposed in the inserting cavity in a second row; the first row and the second row are set in a same side of the main body along a thickness direction of the main body and are arranged in a side by side manner.

Other features and advantages of the present invention will become more apparent to those skilled in the art upon examination of the following drawings and detailed description of preferred embodiments, in which:

DETAILED DESCRIPTION OF PREFERRED EMBODIMENT

Reference will now be made in detail to the preferred embodiments of the present invention.

Figure 1:
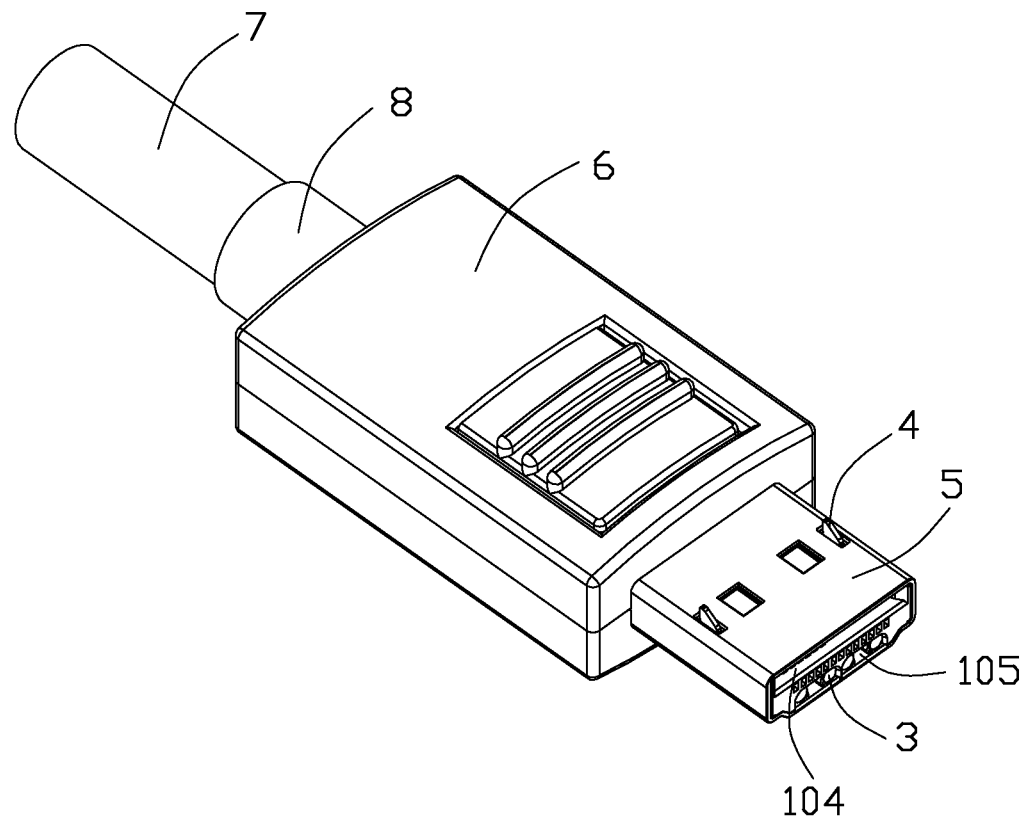
FIG. 1 is an assembled, perspective view of a cable assembly with a connector in accordance with a preferred embodiment of present invention.
Figure 2:
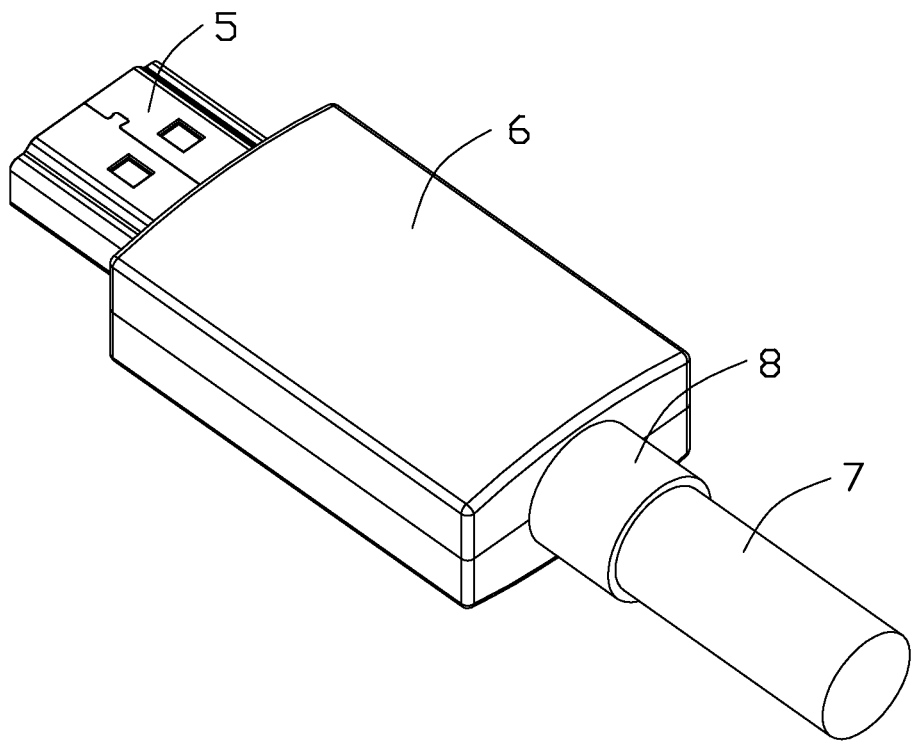
FIG. 2 is similar to FIG. 1, but taken from another side.

Referring to FIGS. 1-2, a cable assembly in accordance to present invention, comprises a connector and an insulative cover 6 enclosing the connector, a cable 7 connecting the contacts and the optical member 3 and a strain relief member 8 molding on a front end of the cable 7. The connector has an insulative housing 1, a plurality of contacts received in the insulative housing 1, an optical member 3 assembled to the insulative housing 1 and movable along a front-to-back direction, a pair of metallic latching members 4 retained to the insulative housing 1, a metallic shell 5 covering the insulative housing 1.

The insulative housing 1 includes a main body 10 and two mounting arms 12 extending rearward from lateral sides of the main body 10. A retaining slot 101 is defined in the mounting arm 12 and partial of main body 10 in front of the mounting arm 12. A receiving space 102 is recessed forwardly from a middle segment of a rear edge of the main body 10. The main body 10 defines an inserting cavity 104 recessed downwardly from a front segment of an upper side of the main body 10, a depression 105 in a front section of a lower side of the main body 10 and under the inserting cavity 104 and a separated wall 106 disposed between the inserting cavity 104 and the depression 105. The inserting cavity 104 further communicates with the receiving space 102. There is a supporting portion 1051 disposed in a middle segment of the depression 105. The separated wall 106 defines a plurality of passageways 1041 communicating with the inserting cavity 104.

Figure 6:
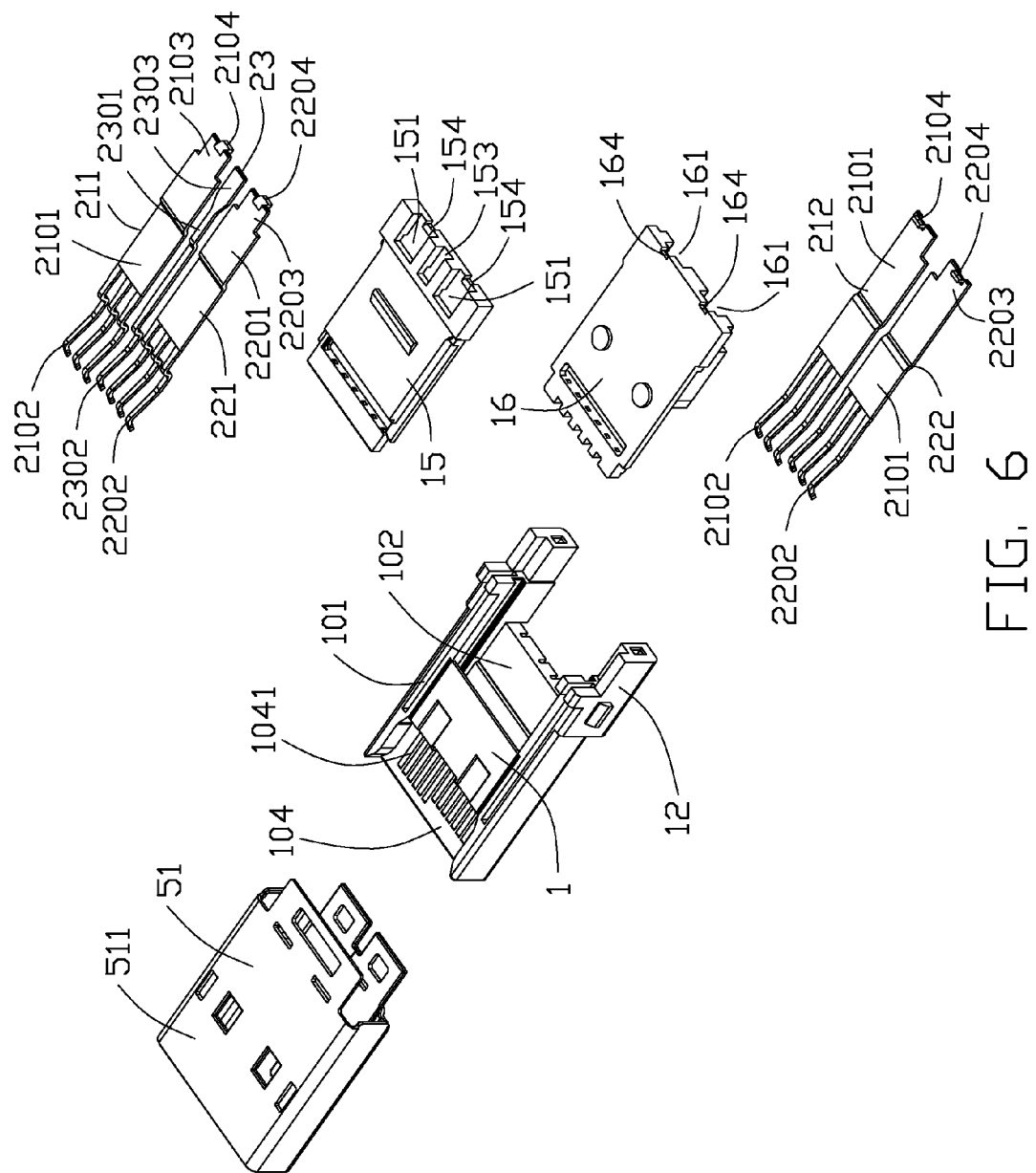
FIG. 6 is an exploded, perspective view of the connector in FIG. 5.
Figure 7:
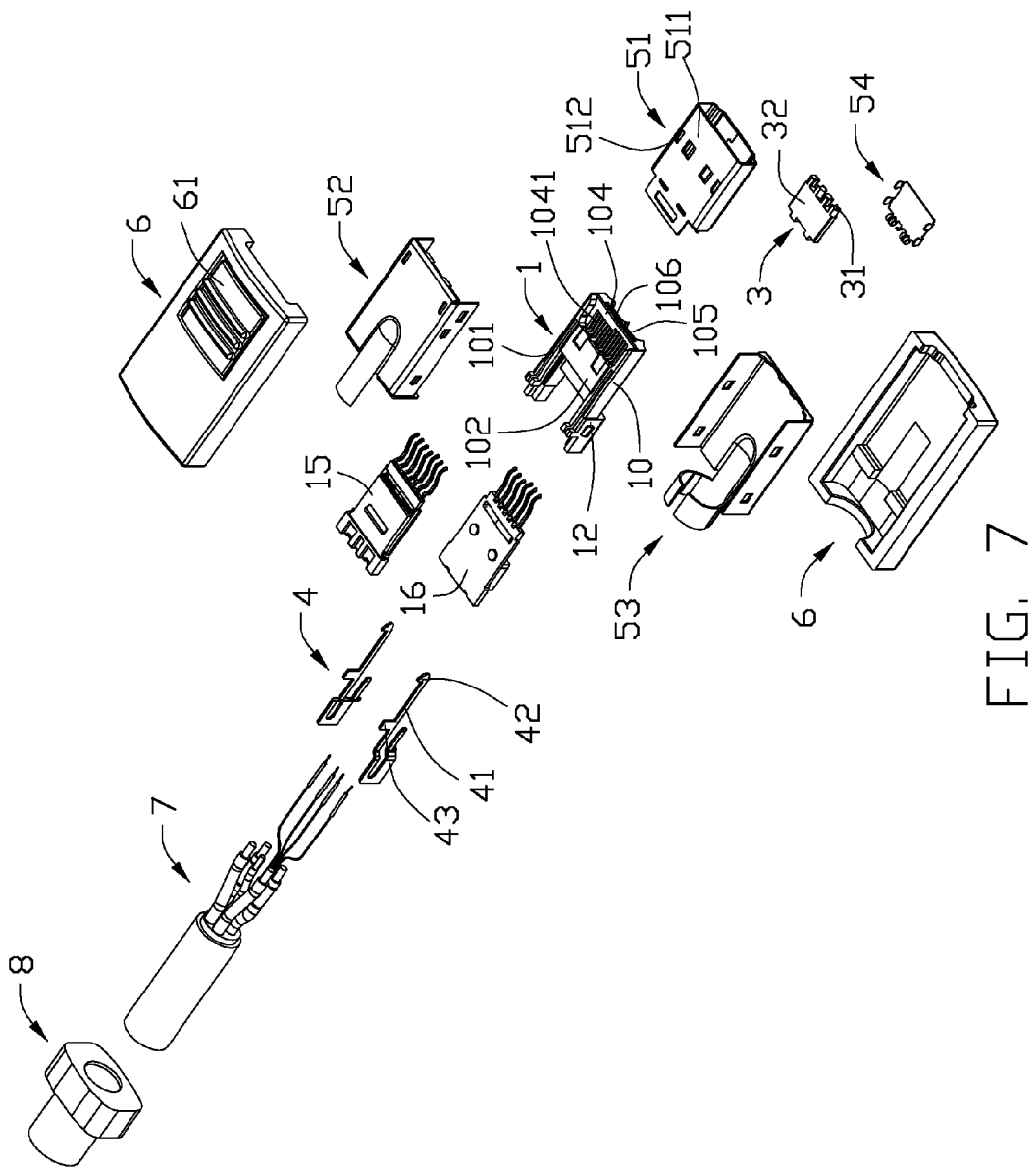
FIG. 7 is an exploded, perspective view of the cable assembly.
Figure 8:
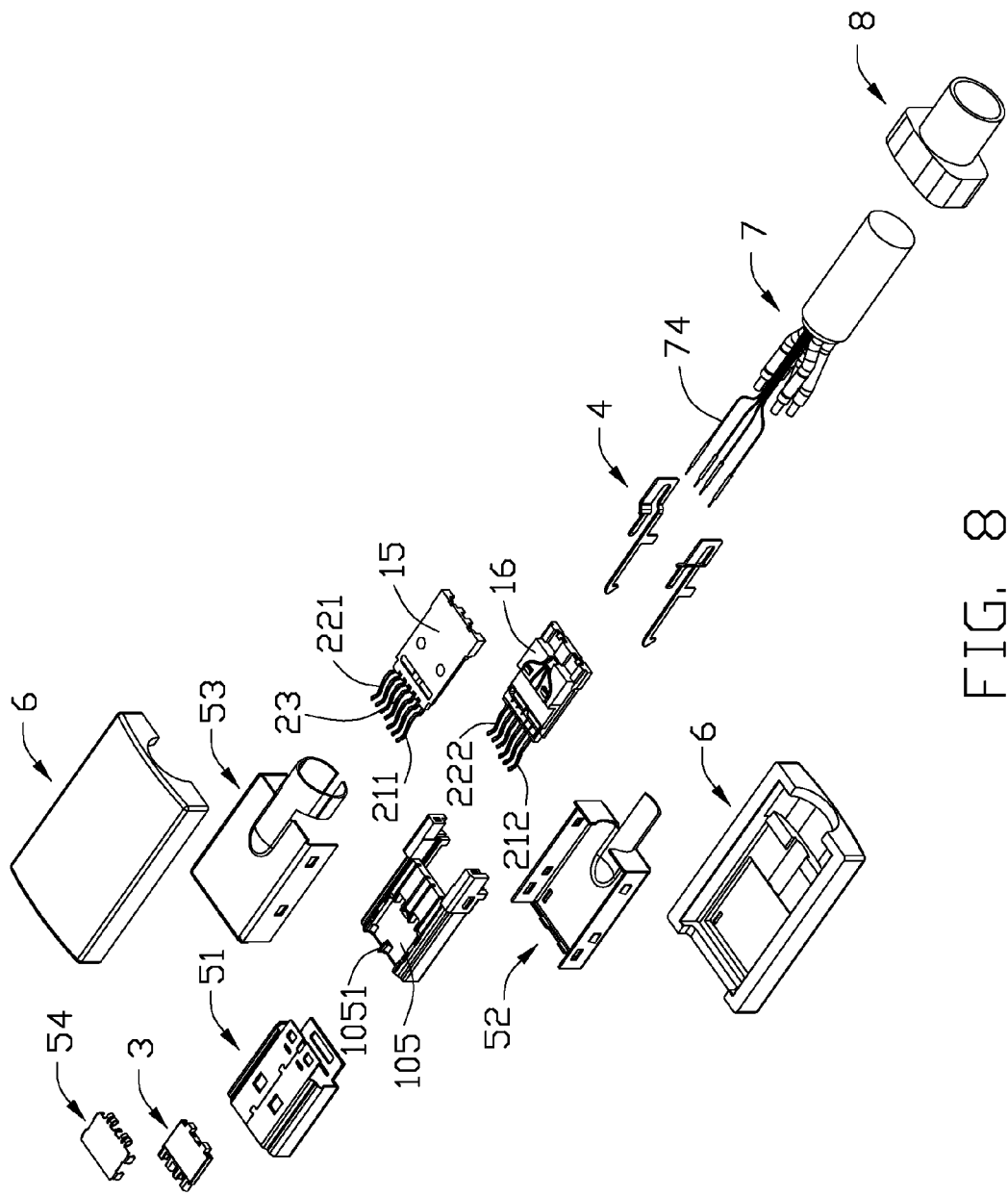
FIG. 8 is similar to FIG. 7, but taken from a bottom side.

The insulative housing 1 includes a first insulator 15 and a second insulator 16, the first and the second insulators 15, 16 are stacked with each other and then assembled to the receiving space 12 of the main body 10 together. Conjoined with FIG. 6, the first insulator 15 is retained to the second insulator 16, the first insulator 15 has two first recesses 151 and a third recess 153 between the first recesses 151 on a top of a rear part thereof. A first gap 154 passes through the first insulator 15 from each of the first recess 151. The second insulator 16 defines two second recesses 161 on a bottom of a rear part thereof, which are aligned with corresponding first recesses 151. A second gap 164 passes through the second insulator 16 from each of the second recess 161 and communicates with corresponding first gap 154.

The contacts comprise two grounding contacts, two power contacts and a signal contact 23, the grounding contacts comprises a first grounding contact 211 and a second grounding contact 212, the power contacts comprises a first power contact 221 and a second power contact 222, the signal terminal 23 is between the first grounding contact 211 and the first power contact 221.

Each of the grounding contacts 211, 212 has a piece-like first retaining portion 2101, a plurality of arched first contacting portions 2102 forwardly extending from the first retaining portion 2101 and a first soldering portion 2103 rearward extending from the first retaining portion 2101. The first grounding contact 211 further has a first tail 2104 vertically and downwardly bent from the first soldering portion 2103 thereof, the second grounding contact 212 further has another first tail 2104 vertically and upwardly bent from the first soldering portion 2103 thereof.

Each of the power contacts 221, 222 has a piece-like second retaining portion 2201, a plurality of arched second contacting portions 2202 forwardly extending from the second retaining portion 2201 and a second soldering portion 2203 rearward extending from the second retaining portion 2201. The first power contact 221 further has a second tail 2204 vertically and downwardly bent from the second soldering portion 2203 thereof, the second grounding contact 222 further has another second tail 2204 vertically and upwardly bent from the second soldering portion 2203 thereof.

The signal contact 23 has a piece-like third retaining portion 2301, an arched third contacting portion 2302 forwardly extending from the third retaining portion 2301 and a third soldering portion 2303 rearward extending from the third retaining portion 2301.

The retaining portions 2101, 2201, 2301 and the soldering portions 2103, 2203, 2303 of the first grounding contact 211, the first power contact 221 and the signal contact 23, respectively, are insert-molded with the first insulator 15; the soldering portions 2103, 2203, 2303 of the first grounding contact 211, the first power contact 221 and the signal contact 23 are exposed in the first and the third recesses 151, 153; the first and second tail portions 2104, 2204 of the first grounding contact 211 and the first power contact 221 are received in the first gaps 154. The retaining portions 2101, 2201 and the soldering portions 2103, 2203 of the second grounding contact 212 and the second power contact 222, respectively, are insert-molded with the second insulator 16; the soldering portions 2103, 2203 of the second grounding contact 212 and the second power contact 222 are exposed in the second recesses 161; the first and second tail portion 2104, 2204 of the second grounding contact 212 and the second power contact 222 are received in the second gaps 164.

Figure 5:
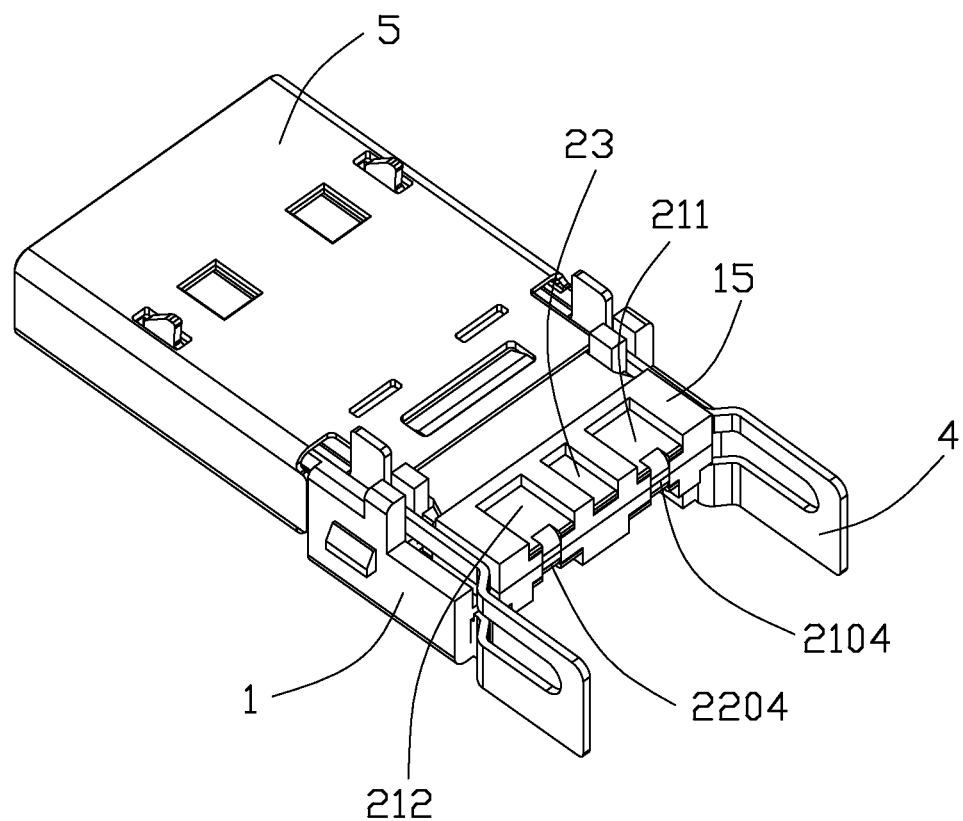
FIG. 5 is a perspective view of the connector of the cable assembly.

Referring to FIG. 5, the first tail portions 2104 of the first and second grounding contacts 211, 212 are aligned with each other along a top-to-bottom direction and abut against each other; and the second tail portions 2204 of the first and second power contacts 221, 222 are aligned with each other along the top-to-bottom direction and abut against each other. The first, the second and the third contact portions 2102, 2202 and 2302 extend forwardly beyond the first and the second insulator 15, 16 and array in the passageways 1041 of the insulative housing 1. The first, the second and the third contact portions 2102, 2202 and 2302 are exposed in the inserting cavity 104 to mate with a mating connector.

The first contacting portions 2102 of the first grounding contact 211 and the first contacting portions 2102 of the second grounding contact 212 are alternately disposed in a first row along a left-to-right direction; the second contacting portions 2202 of the first power contact 221 and the second contacting portions 2202 of the second power contact 222 are alternately disposed in a second row along the left-to-right direction; the first row is in same side of the main body 10 as the second row along a thickness direction of the main body 10 and closes to a front opening of the inserting cavity 104 rather than the second row. The third contacting portion 2302 of the signal contact 23 arrays with in the second row, and is between two adjacent first contacting portion 2102 and a second contacting portion 2202. Every two contacting portions 2102, 2202, 2302 has an equal distance therebetween, this is a new contact arrangement, so the connector can mate with a new mating connector.

The optical member 3 is assembled within the depression 105 and movable along a front-to-back direction when mating with the mating connector. The optical member 3 includes a number of lenses 31, and a seat 32 enclosing the lenses 31. The cable 7 connects with a plurality of fibers 74 connecting rear ends of the lenses 31 to couple to the lenses 31.

The latching member 4 includes a latching arm 41 received in the retaining slot 101 of the insulative housing 1, a locking portion 42 protruding from a front of the latching arm 41 and beyond the connector and a protrusion piece 43 protruding from the latching arm 41 and located behind the locking portion 42.

The metallic shell 5 has a first shell 51, a second shell 52, a third shell 53 and an inner shell 54. The first shell 5 includes a frame 511 surrounding the insulative housing 1 and covering the inserting cavity 104 and a depression 105. The frame 511 has two holes 512 on two sides of a top wall thereof for the locking portions 42 passing through. The inner shell 54 is fixed to the main body 10 of the insulative housing 1 and covers the optical member 3. the second shell 52 and the third shell 53 latch with each other to surround the insulative housing 1, the first shell 51 and the inner shell 54.

The insulative cover 6 has two pieces covering the metallic shell 5, respectively. The insulative cover 6 has an elastic pressing portion 61 on a top thereof, which is floatable along a top-to-bottom direction to actuate the protrusion piece 43 of the latching member 4, to make the locking portion 42 project out of the connector or shrink within the connector.

Figure 3:
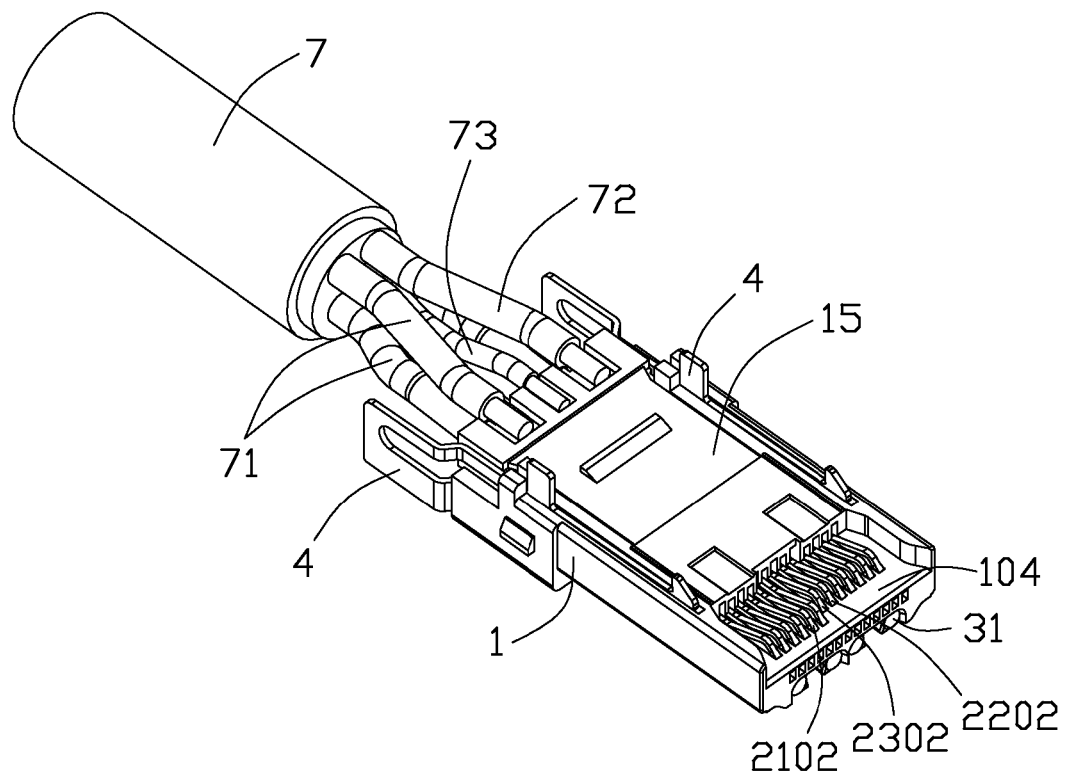
FIG. 3 is a partial perspective view of the cable assembly.
Figure 4:
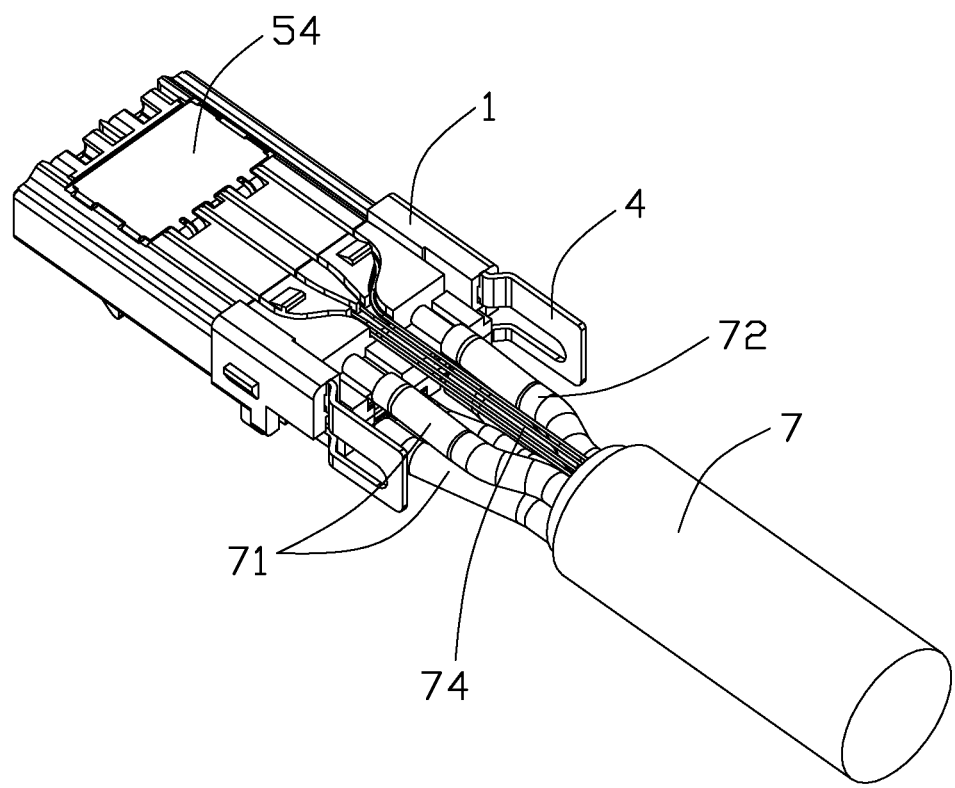
FIG. 4 is a bottom view of the cable assembly in FIG. 3.

Conjoined with FIG. 3 to FIG. 5, the cable 7 comprises two grounding wires 71, two power wires 72, a signal wire 73 and the fibers 74 connecting with the lenses 31 of the optical member 3. The grounding wires 71, the power wires 72 and the signal wire 74 extend into the first, the second and the third recesses 151, 153, 161, respectively, and the grounding wires 71 connect with the first soldering portions of the first and the second grounding contact 211, 212; the power wires 72 connect with the second soldering portions of the first, the second power contacts 221, 22; the signal 73 connects with the third soldering portion 2302 of the signal contact 23. The strain relief member 8 is molded over a front segment of the cable 7 and received in the insulative cover 6.

While the present invention has been described with reference to preferred embodiments, the description of the invention is illustrative and is not to be construed as limiting the invention. Various of modifications to the present invention can be made to preferred embodiments by those skilled in the art without departing from the true spirit and scope of the invention as defined by the appended claims.

What is claimed is:

1. A connector comprising:
an insulative housing having a main body with an inserting cavity;
a plurality of contacts received in the insulative housing, the contacts having at least one grounding contact and at least one power contact, the at least one grounding contact formed with a plurality of first contacting portions exposed in the inserting cavity in a first row, the at least one power contact formed with a plurality of second contacting portions exposed in the inserting cavity in a second row, the first row and the second row being set in a same side of the main body along a thickness direction of the main body and being arranged in a side by side manner; wherein the first row is closer to a front opening of the inserting cavity than the second row; wherein the contacts further comprise a signal contact with a third contacting portion extending into the inserting cavity, and the signal contact is disposed between two adjacent first contacting portion and second contacting portion and located in the second row; wherein a distance between each two adjacent contacting portions, including the first, the second and the third contacting portions, is the same; wherein the at least one grounding contact includes a first and a second grounding contacts, the first contacting portions of the first grounding contact and the first contacting portions of the second grounding contact are alternately disposed in the first row; wherein the at least one power contact includes a first and a second power contacts, the second contacting portions of the first power contact and the second contacting portions of the second power contact are alternately disposed in the second row.

2. The connector as described in claim 1, wherein the insulative housing further comprises a first insulator and a second insulator, the first grounding contact, the first power contact and the signal contact are insert-molded with the first insulator, the second grounding contact and the second power contact are insert-molded with the second insulator, the first and the second insulators are stacked with each other and then assembled to a receiving space of the main body together.

3. The connector as described in claim 2, wherein the first insulator defines two first recesses on a top of a rear part thereof, the second insulator defines two second recesses on a bottom of a rear part thereof, and the first insulator further has a third recess between the two first recesses.

4. The connector as described in claim 3, wherein the first grounding contact and the first power contact each have a soldering portion located in the first recess for soldering with a grounding wire and a power wire, respectively; the second grounding contact and the second power contact each have a soldering portion located in the second recess for soldering with another grounding wire and another power wire, respectively; the signal contact have another soldering portion located in the third recess for soldering with a signal wire.

5. The connector as described in claim 4, wherein the first insulator and the second insulator has gaps each aligned with and communicating with one of the first and the second recesses, the first grounding contact and the first power contact each have a tail portion bent downwardly from the soldering portion thereof and received into the gap of the first insulator, the second grounding contact and the second power contact each have a tail portion bent upwardly from the soldering portion thereof and received into the gap of the second insulator.

6. The connector as described in claim 5, wherein the tail portions of the first and second grounding contacts are aligned with each other along a top-to-bottom direction and abut against each other; and the tail portions of the first and second power contacts are aligned with each other along the top-to-bottom direction and abut against each other.

7. The connector as described in claim 5, wherein the inserting cavity is recessed downwardly from a front segment of an upper side of the main body, a depression is defined in a front section of a lower side of the main body and a separated wall is disposed between the inserting cavity and the depression, the separated wall defines a plurality of passageways communicating with the inserting cavity to receive said contacting portions.

8. A connector comprising:
an insulative housing having a main body with an inserting cavity;
a plurality of contacts received in the insulative housing, the contacts having two grounding contacts and two power contacts, each grounding contact formed with a plurality of first contacting portion, each power contact formed with a plurality of second contacting portion, and the first contacting portions of the first and the second grounding contacts alternately disposed within the inserting cavity and located in a first row, the second contacting portions of the first and the second power contacts alternately disposed within the inserting cavity and located in a second row, the first row being closer to a front opening of the inserting cavity than the second row; a signal contact with a third contacting portion extending into the inserting cavity, and the signal contact is disposed between two adjacent first contacting portion and second contacting portion and arrays in the second row; wherein the insulative housing further comprises a first insulator and a second insulator, the first grounding contact, the first power contact and the signal contact are insert-molded with the first insulator, the second grounding contact and the second power contact are insert-molded with the second insulator, the first and the second insulators are stacked with each other and then assembled to a receiving space of the main body together.

9. An electrical connector comprising:
an insulative housing defining a front mating port forwardly communicating with an exterior in a front-to-back direction;
a first contact module and a second contact module stacked with each other in a vertical direction perpendicular to said front-to-back direction, at least one first contacts and at least one second contact integrally formed within the first and second contact modules, respectively, the first contact defining a plurality of first front contacting portions spaced from one another in a transverse direction perpendicular to both said front-to-back direction and said vertical direction, and a monolithic first rear wire connection portion, the second contact defining a plurality of second front contacting portions spaced from one another in the transverse direction and a monolithic second rear wire connection portion; wherein
said first front contacting portions and said second front contacting portions are alternately arranged with each other essentially at a same level along the vertical direction in the mating port while the first rear wire connection portion and the second rear wire connection portion are spaced from each other at different levels in the vertical direction and respectively face outward away from each other for connecting to corresponding wires; wherein the first contact module further includes a third contact beside the first contact in said transverse direction, said third contact having a plurality of third front contacting portions spaced from one another in said transverse direction and essentially located at the same level with the first front contacting portions while being offset from the first front contacting portions in the front-to-back direction, and a monolithic third rear wire connection portion located at a same level with the first rear wire connection portion, and the second contact module further includes a fourth contact beside the second contact in the transverse direction, said fourth contact having a plurality of fourth front contacting portions spaced from one another in the transverse direction and essentially located at the same level with the second front contacting portions in the vertical direction and alternate arranged with the third front contacting portions in the transverse direction, and a monolithic four rear wire connection portion located at the same level with the second rear wire connection portion while at the different levels with the third rear wire connection portion; further including a fifth contact located at the same level with the first contact and the third contact in the vertical direction and between the first contact and the third contact in the transverse direction.

10. The electrical connector as claimed in claim 9, wherein the first contact module includes a first insulator for holding the corresponding first contact and providing a first platform to support the first rear wire connection portion, and the second contact module includes a second insulator for holding the corresponding second contact and provide a second platform to support the second rear wire connection portion.

11. The electrical connector as claimed in claim 9, further including a third contact essentially at the same level with the first contact while only with a one third dimension with regard to the first contact in the transverse direction; wherein the third contact is configured to transmit signals while the first contact is configured to transmit power or ground.

* * * * *